US010534511B2

(12) United States Patent
Garcia

(10) Patent No.: US 10,534,511 B2
(45) Date of Patent: Jan. 14, 2020

(54) MULTI-DIMENSIONAL DYNAMIC VISUAL BROWSING

(71) Applicant: PayPal, Inc., San Jose, CA (US)

(72) Inventor: Edward O'Neil Garcia, Redwood City, CA (US)

(73) Assignee: PAYPAL, INC., San Jose, CA (US)

(*) Notice: Subject to any disclaimer, the term of this patent is extended or adjusted under 35 U.S.C. 154(b) by 310 days.

(21) Appl. No.: 14/042,218

(22) Filed: Sep. 30, 2013

(65) Prior Publication Data

US 2014/0040753 A1 Feb. 6, 2014

Related U.S. Application Data

(63) Continuation of application No. 11/950,679, filed on Dec. 5, 2007, now Pat. No. 8,549,407.

(51) Int. Cl.
*G06F 3/0482* (2013.01)
*G06F 16/954* (2019.01)
*G06F 3/0484* (2013.01)
*G06Q 30/08* (2012.01)

(52) U.S. Cl.
CPC .................. *G06F 3/0484* (2013.01)

(58) Field of Classification Search
None
See application file for complete search history.

(56) References Cited

U.S. PATENT DOCUMENTS

| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |

(Continued)

FOREIGN PATENT DOCUMENTS

| CA | 2253543 A1 | 3/1997 |
| FR | 2658635 A1 | 8/1991 |

(Continued)

OTHER PUBLICATIONS

"U.S. Appl. No. 09/491,703, Appeal Brief filed Jan. 2, 2013", 16 pgs.

(Continued)

*Primary Examiner* — Yongjia Pan
(74) *Attorney, Agent, or Firm* — Maschoff Brennan

(57) ABSTRACT

Apparatus, systems, and methods may operate to present a first plurality of visible images indicating a corresponding group of visible element navigation pathways associated with a first level of an online marketplace, receive a selection of one of the first plurality of visual images to provide a selected image, and navigate to a second level of the online marketplace along the visible element navigation pathways by presenting a second plurality of visible images representing one of a super-category including the selected image and a sub-category included in the selected image, wherein the first and second levels form part of at least three levels of visual navigation. Selections may be saved for future manipulation, review, and navigation as a collection of thumbtacked images. Additional apparatus, systems, and methods are disclosed.

16 Claims, 8 Drawing Sheets

(56) References Cited

U.S. PATENT DOCUMENTS

| | | |
|---|---|---|
| 4,823,265 A | 4/1989 | Nelson |
| 4,864,516 A | 9/1989 | Gaither et al. |
| 4,799,156 A | 11/1989 | Shavit et al. |
| 4,903,201 A | 2/1990 | Wagner |
| 4,990,005 A | 2/1991 | Karakawa |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,546,575 A | 8/1996 | Potter et al. |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,715,444 A | 2/1998 | Danish et al. |
| 5,717,989 A | 2/1998 | Tozzoli et al. |
| 5,721,832 A | 2/1998 | Westrope |
| 5,722,418 A | 3/1998 | Bro |
| 5,727,165 A | 3/1998 | Ordish et al. |
| 5,742,768 A | 4/1998 | Gennaro et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,255 A | 12/1998 | Mayaud |
| 5,845,265 A | 12/1998 | Woolston |
| 5,845,266 A | 12/1998 | Lupien et al. |
| 5,848,399 A | 12/1998 | Burke |
| 5,850,442 A | 12/1998 | Muftic |
| 5,872,848 A | 2/1999 | Romney et al. |
| 5,873,069 A | 2/1999 | Reuhl et al. |
| 5,874,412 A | 2/1999 | Priebe et al. |
| 5,877,758 A * | 3/1999 | Seybold .............. G06F 3/04847 715/764 |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,963,208 A * | 10/1999 | Dolan .............. G06F 17/30855 707/E17.013 |
| 5,968,110 A | 10/1999 | Westrope |
| 5,983,219 A | 11/1999 | Danish et al. |
| 5,991,739 A | 11/1999 | Cupps et al. |
| 6,014,638 A * | 1/2000 | Burge .............. G06Q 30/02 705/27.1 |
| 6,029,172 A * | 2/2000 | Jorna .............. G06F 17/30994 |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,069,625 A * | 5/2000 | Nielsen .............. G06F 3/0482 707/E17.116 |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,167,382 A | 12/2000 | Sparks et al. |
| 6,178,408 B1 | 1/2001 | Copple et al. |
| 6,192,407 B1 | 2/2001 | Smith et al. |
| 6,202,051 B1 | 3/2001 | Woolston |
| 6,236,398 B1 * | 5/2001 | Kojima .............. G06F 3/0362 345/419 |
| 6,236,400 B1 | 5/2001 | Guerrero |
| 6,236,400 B1 * | 5/2001 | Wical .............. G06F 17/30572 |
| 6,243,691 B1 | 6/2001 | Fisher et al. |
| 6,252,597 B1 * | 6/2001 | Lokuge .............. G06F 3/0481 715/841 |
| 6,256,028 B1 | 7/2001 | Sanford et al. |
| 6,266,514 B1 | 7/2001 | O'Donnell |
| 6,275,821 B1 | 8/2001 | Danish et al. |
| 6,278,991 B1 * | 8/2001 | Ebert .............. G06F 17/30873 |
| 6,307,573 B1 | 10/2001 | Barros |
| 6,317,722 B1 * | 11/2001 | Jacobi .............. G06Q 30/02 705/14.51 |
| 6,356,899 B1 | 3/2002 | Chakrabarti et al. |
| 6,397,221 B1 | 5/2002 | Greef et al. |
| 6,405,175 B1 | 6/2002 | Ng |
| 6,449,601 B1 | 9/2002 | Friedland et al. |
| 6,462,762 B1 | 10/2002 | Ku et al. |
| 6,466,918 B1 | 10/2002 | Spiegel et al. |
| 6,489,968 B1 * | 12/2002 | Ortega .............. G06F 3/0482 345/594 |
| 6,496,843 B1 | 12/2002 | Getchius et al. |
| 6,518,984 B1 | 2/2003 | Maeckel et al. |
| 6,583,794 B1 * | 6/2003 | Wattenberg ........ G06F 17/30994 707/999.102 |
| 6,704,729 B1 * | 3/2004 | Klein .............. G06F 17/30696 |
| 6,721,713 B1 | 4/2004 | Guheen |
| 6,819,344 B2 * | 11/2004 | Robbins .............. G06T 11/206 345/441 |
| 6,877,015 B1 * | 4/2005 | Kilgore .............. G06Q 30/06 707/700 |
| 6,879,332 B2 * | 4/2005 | Decombe .............. G06F 3/0481 715/764 |
| 6,901,403 B1 | 5/2005 | Bata et al. |
| 6,912,505 B2 * | 6/2005 | Linden .............. G06Q 30/02 705/14.53 |
| 6,922,816 B1 * | 7/2005 | Amin .............. G06F 3/04847 715/732 |
| 6,934,690 B1 | 8/2005 | Van Horn et al. |
| 6,957,186 B1 | 10/2005 | Guheen et al. |
| 6,961,731 B2 * | 11/2005 | Holbrook .......... G06F 17/30696 |
| 6,963,339 B2 * | 11/2005 | Leah .............. G06T 11/40 345/440 |
| 6,990,638 B2 * | 1/2006 | Barksdale .............. G09G 5/30 715/853 |
| 7,028,261 B2 * | 4/2006 | Smyth .............. G06F 17/30873 707/E17.109 |
| 7,035,864 B1 | 4/2006 | Ferrari et al. |
| 7,113,917 B2 * | 9/2006 | Jacobi .............. G06Q 30/02 705/14.53 |
| 7,165,041 B1 | 1/2007 | Guheen et al. |
| 7,191,147 B2 | 3/2007 | Heene et al. |
| 7,191,411 B2 * | 3/2007 | Moehrle .......... G06F 17/30126 715/829 |
| 7,206,757 B2 * | 4/2007 | Seigel .............. G06F 17/3087 705/26.41 |

(56) References Cited

U.S. PATENT DOCUMENTS

| | | | |
|---|---|---|---|
| 7,209,895 B2* | 4/2007 | Kundtz | G06Q 30/02 |
| | | | 705/14.27 |
| 7,263,515 B1* | 8/2007 | Tenorio | G06Q 30/02 |
| 7,266,768 B2* | 9/2007 | Ferlitsch | G06F 17/24 |
| | | | 715/273 |
| 7,292,243 B1* | 11/2007 | Burke | G09B 5/00 |
| | | | 345/440 |
| 7,315,826 B1 | 1/2008 | Guheen et al. | |
| 7,330,845 B2* | 2/2008 | Lee | G06F 17/30864 |
| 7,350,158 B2* | 3/2008 | Yamaguchi | G06F 3/0481 |
| | | | 715/814 |
| 7,366,721 B1* | 4/2008 | Bennett | G06Q 30/02 |
| | | | 711/206 |
| 7,373,614 B1* | 5/2008 | Holmes | G06F 17/30876 |
| | | | 702/187 |
| 7,386,477 B2* | 6/2008 | Fano | G06F 17/3087 |
| | | | 705/26.43 |
| 7,389,294 B2* | 6/2008 | Kotas | G06Q 10/087 |
| | | | 705/28 |
| 7,398,229 B2 | 7/2008 | Budish | |
| 7,404,142 B1* | 7/2008 | Tischer | G06F 17/30905 |
| | | | 715/234 |
| 7,424,686 B2* | 9/2008 | Beam | G06F 3/0481 |
| | | | 707/999.102 |
| 7,434,177 B1* | 10/2008 | Ording | G06F 3/04842 |
| | | | 345/157 |
| 7,493,315 B2* | 2/2009 | Holbrook | G06F 17/3089 |
| 7,523,114 B2* | 4/2009 | Seamon | G06F 17/30873 |
| 7,555,476 B2* | 6/2009 | Holbrook | G06F 17/30696 |
| 7,567,979 B2* | 7/2009 | Prasad | G06F 17/3089 |
| 7,620,631 B2* | 11/2009 | Paek | G06F 17/30864 |
| 7,681,150 B2* | 3/2010 | Hsieh | G06F 3/04815 |
| | | | 715/810 |
| 7,685,074 B2* | 3/2010 | Linden | G06Q 30/02 |
| | | | 705/26.7 |
| 7,698,261 B1* | 4/2010 | Khoshnevisan | G06F 17/30864 |
| | | | 707/999.003 |
| 7,774,335 B1* | 8/2010 | Scofield | G06F 17/30864 |
| | | | 707/709 |
| 7,797,271 B1* | 9/2010 | Bonneau | G06F 17/30873 |
| | | | 705/26.8 |
| 7,805,339 B2* | 9/2010 | Ashkenazi | G06Q 10/087 |
| | | | 705/14.54 |
| 7,822,635 B1* | 10/2010 | Brown | G06Q 30/02 |
| | | | 705/14.1 |
| 7,839,385 B2 | 11/2010 | Hunleth et al. | |
| 7,949,573 B1* | 5/2011 | Cohen | G06Q 30/02 |
| | | | 705/14.54 |
| 7,979,445 B2* | 7/2011 | Mason | G06F 17/30867 |
| | | | 707/734 |
| 8,037,424 B2* | 10/2011 | Kujda | G06F 3/0481 |
| | | | 715/815 |
| 8,082,184 B2 | 12/2011 | Yruski et al. | |
| 8,095,521 B2* | 1/2012 | Chan | G06Q 30/02 |
| | | | 707/705 |
| 8,108,260 B2* | 1/2012 | Maguire | G06F 17/3071 |
| | | | 705/26.1 |
| 8,122,360 B2* | 2/2012 | Harinarayan | G06F 17/30867 |
| | | | 715/738 |
| 8,214,360 B2* | 7/2012 | Arellanes | G06F 17/30696 |
| | | | 707/731 |
| 8,335,784 B2* | 12/2012 | Gutt | G06F 3/04815 |
| | | | 707/722 |
| 8,438,487 B1* | 5/2013 | Lin-Hendel | G06F 3/0482 |
| | | | 715/738 |
| 8,473,868 B1* | 6/2013 | Kauffman | G06F 3/0482 |
| | | | 715/810 |
| 8,549,407 B2 | 10/2013 | O'Neil Garcia | |
| 8,571,941 B2* | 10/2013 | Perrier | G06F 17/30595 |
| | | | 705/26.1 |
| 8,584,047 B2* | 11/2013 | Athans | G06F 3/0481 |
| | | | 707/778 |
| 8,621,359 B2* | 12/2013 | Cao | G06F 3/0482 |
| | | | 715/734 |
| 8,670,993 B2 | 3/2014 | Henley | |
| 8,781,940 B2* | 7/2014 | Poon | G06Q 30/0601 |
| | | | 705/26.61 |
| 9,014,713 B1* | 4/2015 | Shaw | G06Q 30/0267 |
| | | | 455/412.1 |
| 9,058,094 B2 | 6/2015 | Poon | |
| 9,477,985 B2* | 10/2016 | Poon | G06Q 30/0601 |
| 9,584,868 B2* | 2/2017 | Diaz Perez | G06Q 30/02 |
| 2001/0035885 A1* | 11/2001 | Iron | G06F 3/0481 |
| | | | 715/855 |
| 2002/0062265 A1 | 5/2002 | Poon et al. | |
| 2002/0077927 A1* | 6/2002 | Lasnier | G06Q 30/0226 |
| | | | 705/14.27 |
| 2002/0087426 A1* | 7/2002 | Shiitani | G06Q 30/02 |
| | | | 705/26.61 |
| 2002/0103692 A1* | 8/2002 | Rosenberg | G06Q 30/0201 |
| | | | 705/7.29 |
| 2002/0112237 A1* | 8/2002 | Kelts | G06F 3/0481 |
| | | | 725/39 |
| 2002/0138481 A1 | 9/2002 | Aggarwal et al. | |
| 2003/0041004 A1 | 2/2003 | Parry et al. | |
| 2003/0048309 A1* | 3/2003 | Tambata | G01C 21/3664 |
| | | | 715/810 |
| 2003/0050916 A1* | 3/2003 | Ortega | G06F 3/0482 |
| 2003/0061122 A1 | 3/2003 | Berkowitz et al. | |
| 2003/0065706 A1* | 4/2003 | Smyth | G06F 17/30867 |
| | | | 709/200 |
| 2003/0065737 A1 | 4/2003 | Aasman | |
| 2003/0085931 A1* | 5/2003 | Card | G06F 17/30873 |
| | | | 715/853 |
| 2003/0103070 A1* | 6/2003 | Tiongson | G06F 17/30893 |
| | | | 715/700 |
| 2003/0122877 A1* | 7/2003 | Ravikumar | G06F 3/0482 |
| | | | 715/811 |
| 2003/0139901 A1* | 7/2003 | Forman | G06F 17/18 |
| | | | 702/179 |
| 2003/0171944 A1* | 9/2003 | Fine | G06Q 30/06 |
| | | | 705/2 |
| 2004/0128224 A1* | 7/2004 | Dabney | G06Q 30/08 |
| | | | 705/37 |
| 2004/0153371 A1 | 8/2004 | Razumov | |
| 2004/0239649 A1* | 12/2004 | Ludtke | G06F 3/04883 |
| | | | 345/173 |
| 2004/0254853 A1 | 12/2004 | Heene et al. | |
| 2005/0071251 A1 | 3/2005 | Linden et al. | |
| 2005/0144093 A1* | 6/2005 | Kassan | G06Q 30/06 |
| | | | 705/26.3 |
| 2005/0171940 A1* | 8/2005 | Fogg | G06F 17/30554 |
| 2005/0216362 A1 | 9/2005 | Navar et al. | |
| 2005/0251515 A1* | 11/2005 | Reed | G06F 17/30038 |
| 2005/0273417 A1 | 12/2005 | Budish | |
| 2006/0004692 A1* | 1/2006 | Kaasten | G06F 17/30115 |
| 2006/0048076 A1* | 3/2006 | Vronay | G06F 3/0482 |
| | | | 715/850 |
| 2006/0048077 A1* | 3/2006 | Boyles | G06F 3/0481 |
| | | | 715/853 |
| 2006/0085253 A1 | 4/2006 | Mengerink et al. | |
| 2006/0150125 A1* | 7/2006 | Gupta | G06F 8/38 |
| | | | 715/864 |
| 2006/0167760 A1 | 7/2006 | Chakraborty et al. | |
| 2006/0173742 A1 | 8/2006 | Heene | |
| 2007/0073591 A1 | 3/2007 | Perry et al. | |
| 2007/0094259 A1* | 4/2007 | Shi | G06Q 30/02 |
| 2007/0100799 A1* | 5/2007 | Rose | G06F 16/2425 |
| 2007/0130013 A1* | 6/2007 | Robert | G06Q 30/0241 |
| | | | 705/14.4 |
| 2007/0150368 A1* | 6/2007 | Arora | G06Q 30/02 |
| | | | 705/26.1 |
| 2007/0195947 A1* | 8/2007 | Puumalainen | H04M 1/27455 |
| | | | 379/354 |
| 2007/0244758 A1* | 10/2007 | Xie | G06Q 30/02 |
| | | | 705/14.51 |
| 2007/0250864 A1* | 10/2007 | Diaz Perez | G06Q 30/02 |
| | | | 725/52 |
| 2008/0091553 A1 | 4/2008 | Koski | |

(56) References Cited

U.S. PATENT DOCUMENTS

| | | | |
|---|---|---|---|
| 2008/0120291 A1 | 5/2008 | Delgo et al. | |
| 2008/0120571 A1* | 5/2008 | Chang | G06F 3/0483 715/810 |
| 2008/0141166 A1* | 6/2008 | Goldberg | G06F 3/04817 715/788 |
| 2008/0189187 A1* | 8/2008 | Hao | G06F 17/243 705/26.41 |
| 2008/0243815 A1* | 10/2008 | Chan | G06F 17/30867 |
| 2008/0270946 A1* | 10/2008 | Risch | G06F 17/30716 715/848 |
| 2008/0295008 A1* | 11/2008 | Kujda | G06F 3/0481 715/764 |
| 2009/0019008 A1* | 1/2009 | Moore | G06Q 30/0269 |
| 2009/0031253 A1* | 1/2009 | Lee | G06F 3/0488 715/835 |
| 2009/0037291 A1* | 2/2009 | Dawson | G06Q 30/02 705/27.2 |
| 2009/0037292 A1* | 2/2009 | Panjwani | G06Q 30/06 705/26.64 |
| 2009/0132459 A1* | 5/2009 | Hicks | G06Q 30/0269 706/52 |
| 2009/0150791 A1 | 6/2009 | Garcia et al. | |
| 2009/0248635 A1 | 10/2009 | Gross | |
| 2010/0036968 A1* | 2/2010 | Vance | G06F 3/04817 709/239 |
| 2011/0029403 A1 | 2/2011 | Xu | |
| 2013/0013440 A1 | 1/2013 | Raghavan | |
| 2013/0024456 A1* | 1/2013 | Goodson | G06F 17/30864 707/740 |
| 2013/0067114 A1* | 3/2013 | Hjelm | G06O 30/0282 709/243 |
| 2013/0125236 A1 | 5/2013 | Lalonde et al. | |
| 2013/0268561 A1 | 10/2013 | Christie et al. | |
| 2013/0290125 A1 | 10/2013 | Raghavan | |
| 2014/0075004 A1 | 3/2014 | Van Dusen et al. | |
| 2014/0142973 A1 | 5/2014 | Henley | |
| 2014/0325453 A1 | 10/2014 | Poon | |
| 2016/0048910 A1 | 2/2016 | Poon | |

FOREIGN PATENT DOCUMENTS

| | | |
|---|---|---|
| NL | 9300266 A | 9/1994 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

"U.S. Appl. No. 09/491,703 , Response filed Oct. 1, 2012 to Final Office Action dated Jun. 29, 2012", 12 pgs.
"U.S. Appl. No. 09/491,703, Advisory Action dated Jun. 17, 2008", 3 pgs.
"U.S. Appl. No. 09/491,703, Appeal Brief filed Sep. 29, 2008", 24 pgs.
"U.S. Appl. No. 09/491,703, Final Office Action dated Mar. 26, 2008", 9 pgs.
"U.S. Appl. No. 09/491,703, Final Office Action dated Apr. 4, 2002", 44 pgs.
"U.S. Appl. No. 09/491,703, Final Office Action dated May 31, 2006", 9 pgs.
"U.S. Appl. No. 09/491,703, Final Office Action dated Jun. 29, 2012", 15 pgs.
"U.S. Appl. No. 09/491,703, Final Office Action dated Aug. 14, 2001", 31 pgs.
"U.S. Appl. No. 09/491,703, Non Final Office Action dated Jan. 4, 2011", 9 pgs.
"U.S. Appl. No. 09/491,703, Non Final Office Action dated Jan. 26, 2006", 8 pgs.
"U.S. Appl. No. 09/491,703, Non Final Office Action dated Feb. 27, 2007", 7 pgs.
"U.S. Appl. No. 09/491,703, Non Final Office Action dated Mar. 14, 2001", 19 pgs.
"U.S. Appl. No. 09/491,703, Non Final Office Action dated Oct. 19, 2007", 7 pgs.
"U.S. Appl. No. 09/491,703, Non-Final Office Action dated Dec. 12, 2001", 43 pgs.
"U.S. Appl. No. 09/491,703, Pre-Appeal Brief Request filed Jun. 26, 2008", 4 pgs.
"U.S. Appl. No. 09/491,703, Preliminary Amendment filed Oct. 11, 2002", 45 pgs.
"U.S. Appl. No. 09/491,703, Preliminary Amendment filed Nov. 14, 2001", 28 pgs.
"U.S. Appl. No. 09/491,703, Response filed Mar. 12, 2002 to Non Final Office Action dated Dec. 12, 2001", 7 pgs.
"U.S. Appl. No. 09/491,703, Response filed Mar. 20, 2006 to Non Final Office Action dated Jan. 28, 2006", 12 pgs.
"U.S. Appl. No. 09/491,703, Response filed May 27, 2008 to Final Office Action dated Mar. 26, 2008", 14 pgs.
"U.S. Appl. No. 09/491,703, Response filed May 29, 2007 to Non Final Office Action dated Feb. 27, 2007", 17 pgs.
"U.S. Appl. No. 09/491,703, Response filed May 4, 2012 to Non Final Office Action dated Jan. 4, 2012", 12 pgs.
"U.S. Appl. No. 09/491,703, Response filed Jul. 13, 2001 to Non Final Office Action dated Mar. 14, 2001", 39 pgs.
"U.S. Appl. No. 09/491,703, Response filed Jul. 27, 2005 to Restriction Requirement dated Jun. 28, 2005", 18 pgs.
"U.S. Appl. No. 09/491,703, Response filed Nov. 30, 2006 to Final Office Action dated May 31, 2006", 13 pgs.
"U.S. Appl. No. 09/491,703, Response filed Dec. 11, 2007 to Non-Final Office Action dated Oct. 19, 2007", 13 pgs.
"U.S. Appl. No. 09/491,703, Restriction Requiremen dated Jun. 28, 2005", 5 pgs.
"U.S. Appl. No. 09/491,703, Supplemental Appeal Brief flied Sep. 8, 2009", 24 pgs.
"U.S. Appl. No. 09/953,749, Advisory Action dated Jan. 7, 2010", 3 pgs.
"U.S. Appl. No. 09/953,749, Advisory Action dated Nov. 20, 2003", 2 pgs.
"U.S. Appl. No. 09/953,749, Appeal Brief filed Feb. 5, 2010", 27 pgs.
"U.S. Appl. No. 09/953,749, Appeal Brief filed Feb. 15, 2006", 24 pgs.
"U.S. Appl. No. 09/953,749, Appeal Brief filed Apr. 11, 2005", 21 pgs.
"U.S. Appl. No. 09/953,749, Appeal Brief filed May 18, 2007", 27 pgs.
"U.S. Appl. No. 09/953,749, Appeal Brief filed Sep. 25, 2006", 25 pgs.
"U.S. Appl. No. 09/953,749, Examiner's Answer to Appeal Brief dated Apr. 15, 2010", 7 pgs.
"U.S. Appl. No. 09/953,749, Final Office Action dated Sep. 2, 2003", 6 pgs.
"U.S. Appl. No. 09/953,749, Final Office Action dated Dec. 1, 2004", 5 pgs.
"U.S. Appl. No. 09/953,749, Non Final Office Action dated Feb. 20, 2003", 8 pgs.
"U.S. Appl. No. 09/953,749, Non Final Office Action dated May 25, 2006", 6 pgs.
"U.S. Appl. No. 09/953,749, Non Final Office Action dated Jun. 18, 2004", 5 pgs.
"U.S. Appl. No. 09/953,749, Non Final Office Action dated Jul. 1, 2005", 5 pgs.
"U.S. Appl. No. 09/953,749, Preliminary Amendment filed Jul. 3, 2007", 2 pgs.
"U.S. Appl. No. 09/953,749, Reply Brief filed Jun. 15, 2010", 8 pgs.
"U.S. Appl. No. 09/953,749, Reply Brief filed Nov. 8, 2007", 7 pgs.
"U.S. Appl. No. 09/953,749, Response filed Feb. 10, 2009 to Examiner's Answer dated Dec. 10, 2008", 13 pgs.
"U.S. Appl. No. 09/953,749, Response filed Jun. 3, 2003 to Non Final Office Action dated Feb. 20, 2003", 12 pgs.

(56) References Cited

OTHER PUBLICATIONS

"U.S. Appl. No. 09/953,749, Response filed Aug. 17, 2004 to Non Final Office Action dated Jun. 18, 2004", 12 pgs.
"U.S. Appl. No. 09/953,749, Response filed Sep. 25, 2006 to Non Final Office Action dated May 25, 2006", 19 pgs.
"U.S. Appl. No. 09/953,749, Response filed Nov. 3, 2003 to Final Office Action dated Sep. 2, 2003", 13 pgs.
"U.S. Appl. No. 11/950,679, Advisory Action dated Aug. 25, 2011", 3 pgs.
"U.S. Appl. No. 11/950,679, Final Office Action dated Jun. 9, 2011", 26 pgs.
"U.S. Appl. No. 11/950,679, Non Final Office Action dated Dec. 30, 2010", 23 pgs.
"U.S. Appl. No. 11/950,679, Notice of Allowance dated Jun. 4, 2013", 24 pgs.
"U.S. Appl. No. 11/950,679, Response filed Mar. 30, 2011 to Non Final Office Action dated Dec. 30, 2010", 17 pgs.
"U.S. Appl. No. 11/950,679, Response filed Sep. 8, 2011 to Advisory Action dated Aug. 25, 2011", 15 pgs.
"U.S. Appl. No. 11/650,679, Response to Final Office Action dated Jun. 9, 2011", 13 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pgs.
"Request for Ex Parte Reexamination of U.S. Pat. No. 6,275,821 dated Oct. 28, 2008", 36 pgs.
Baumann, G. W, "Personal Optimized Decision/Transaction Program", IBM Technical Disclosure Bulletin, (Jan. 1995), 83-84.
Clemons, E., "Evaluating the prospects for alternative electronic securities", Proceedings of ICIS 91: 12th International Conference on Information Systems, (Dec. 16-18, 1991), 53-63.
Downing, D. A, et al., "Dictionary of Computer and Internet Terms", Sixth Edition, (1998), 175-177, 383-384.
Graham, Ian, "The Emergence of Linked Fish Markets in Europe", Electronic Markets. vol. 8, No. 2, (1998), 29-32.
Granacki, J., et al., "A Component Library Management System and Browser, Research Report ISI/RR-93-386", University of Southern California Information Sciences Institute, (Apr. 1993), p. 1-19.
Hauser, R., "Anonymous Delivery of Goods in Electronic Commerce", IBM Technical Disclosure Bulletin, 39(3), (Mar. 1996): 363-366.
Hess, C. M, et al., "Computerized Loan Organization System: An Industry Case Study of the Electronic Markets Hypothesis", MIS Quarterly, vol. 18(3), (Sep. 1994), 251-275.
Klein, Stefan, "Introduction to Electronic Auctions", Focus Theme, vol. 7, No. 4, (1997), 3-6.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Malone, T., et al., "Electronic Markets and Electronic Hierarchies", Communications of the ACM, vol. 30. No. 6, (Jun. 1987), 484-497.
Mardesich, Jodi, "Site Offers Clearance for End-of-Life Products—Onsale Takes Auction Gavel Electronic", Computer Reselier News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management, (Jul. 1999), 3 pgs.
Neo, B. S, "The implementation of an electronic market for pig trading in Singapore", Journal of Strategic Information Systems; vol. 1(5), (Dec. 1992), 278-288.

Post, D. L, et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persisten Shout Double Auction", International Conference on Information and Computation Economies. Proceesings of the first international conference on information and computation economies, (1998), 11-18.
Reck, M., "Formally Specifying an Automated Trade Execution System", The Journal of Systems and Software, 1993, Elsevier Science Publishing, USA, (1993), 245-252.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Schmid, B. F, "The Development of Electronic Commerce", EM—Electronic Markets, No. 9-10, (Oct. 1993), 2 pgs.
Siegmann, Ken, "Nowhere to go but up", PC Week; vol. 12(42), Ziff-Davis Publishing Company. (Oct. 23, 1995), 1-3.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.
Turban, Efraim, "Auctions and Bidding on the Internet: An Assessment", Focus Theme, EM—Electronic Markets, vol. 7, No. 4, (1997), 7-11.
Van Heck, E., et al., "Experiences with Electronic Auctions in Dutch Flower Industry", Focus Theme, Erasmus University, The Netherlands, (1996), 6 pgs.
Warbelow, A, et al., "Aucnet: TV Auction Network System", Harvard Business School Case/Study, HBVR#9-190-001, USA, (Jul. 1989), 1-16.
Zwass, V., "Electronic Commerce: Structures and Issues", International Journal of Electronic Commerce, Fall 1996, vol. 1, No. 1, (Fall 1996), 3-23.
U.S. Appl. No. 09/491,703, filed Jan. 26, 2000, Method and Apparatus for Facilitating User Selection of a Category Item in a Transaction, U.S. Pat. No. 8,781,940.
U.S. Appl. No. 09/953,749, filed Sep. 12, 2001, Method and Apparatus for Facilitating User Selection of an Item Category in an Online Auction.
U.S. Appl. No. 14/218,425, filed Mar. 18, 2014, Method and Apparatus for Facilitating User Selection of an Item Category in an Online Auction, U.S. Pat. No. 9,058,094.
U.S. Appl. No. 11/950,679, filed Dec. 5, 2007, Multi-Dimensional Dynamic Visual Browsing, U.S. Pat. No. 8,549,407.
U.S. Appl. No. 14/724,724, filed May 28, 2015, Method and Apparatus for Facilitating User Selection of a Category Item in a Transaction.
"U.S. Appl. No. 09/491,703, Appeal Decision dated Nov. 25, 2013", 7 pgs.
"U.S. Appl. No. 09/491,703, Decision on Appeal dated Sep. 27, 2011", 9 pgs.
"U.S. Appl. No. 09/491,703, Decision on Pre-Appeal Brief Request dated Oct. 25, 2012", 4 pgs.
"U.S. Appl. No. 09/491,703, Examiner Interview Summary dated Mar. 25, 2014", 2 pgs.
"U.S. Appl. No. 09/491,703, Examiner's Amendment filed Mar. 20, 2014", 110 pgs.
"U.S. Appl. No. 09/491,703, Examiner's Answer to Appeal Brief dated Jan. 31, 2013", 16 pgs.
"U.S. Appl. No. 09/491,703, Notice of Allowance dated Dec. 4, 2013", 11 pgs.
"U.S. Appl. No. 09/491,703, PTO Response to 312 Amendment dated Apr. 15, 2014", 2 pgs.
"U.S. Appl. No. 09/491,703, Reply Brief filed Apr. 1, 2013", 10 pgs.
"U.S. Appl. No. 09/953,749, Decision on Pre-Appeal Brief Request dated Nov. 8, 2011", 6 pgs
"U.S. Appl. No. 14/218,425, Examiner Interview Summary dated Dec. 5, 2014", 3 pgs.

(56) References Cited

OTHER PUBLICATIONS

"U.S. Appl. No. 14/218,425, Non Final Office Action dated Oct. 28, 2014", 9 pgs.
"U.S. Appl. No. 14/218,425, Notice of Allowance dated Feb. 9, 2015", 9 pgs.
"U.S. Appl. No. 14/218,425, Preliminary Amendment filed Jul. 8, 2014", 55 pgs.
"U.S. Appl. No. 14/218,425, Response filed Dec. 22, 2014 to Non Final Office Action dated Oct. 28, 2014", 9 pgs.
"U.S. Appl. No. 14/724,724, Preliminary Amendment filed Mar. 10, 2016", 7 pgs.

* cited by examiner

MULTI-DIMENSIONAL DYNAMIC VISUAL BROWSING

RELATED APPLICATIONS

This application is a continuation of U.S. application Ser. No. 11/950,679 filed Dec. 5, 2007, which application is incorporated in its entirety herein by reference.

BACKGROUND

The ubiquitous presence of networked computers, and the growing use of databases, web logs, and email has resulted in the accumulation of vast quantities of information. Many individual computer users now have access to this information via search engines and a bewildering array of web sites. Processing this information in a manner that is user-friendly and efficient creates a number of challenges and complexities.

BRIEF DESCRIPTION OF THE DRAWINGS

The present disclosure is illustrated by way of example and not limitation in the figures of the accompanying drawings, in which.

DETAILED DESCRIPTION

Introduction

Some of the embodiments disclosed herein seek to address the challenge of presenting large amounts of data in a meaningful way, as well as other problems associated with processing a variety of data, by introducing the concept of a multi-dimensional visual browsing environment. Rather than searching for some specific object, (e.g., neighborhood, group or fan club, item or product), visual browsing offers an alternative. This is an exploratory way to navigate content on a web site, for example. The presentation comprises little, if any text, and is made up primarily of images displayed as a type of mosaic. Each tile in the mosaic can lead to a higher or lower level. A "mouse over" action taken with respect to any particular image can provide the user with general information about the item represented, while selecting the image itself (e.g., via mouse click) permits the user to navigate to a higher or lower level, or to view more detailed information.

Example Operations

Figure 1:
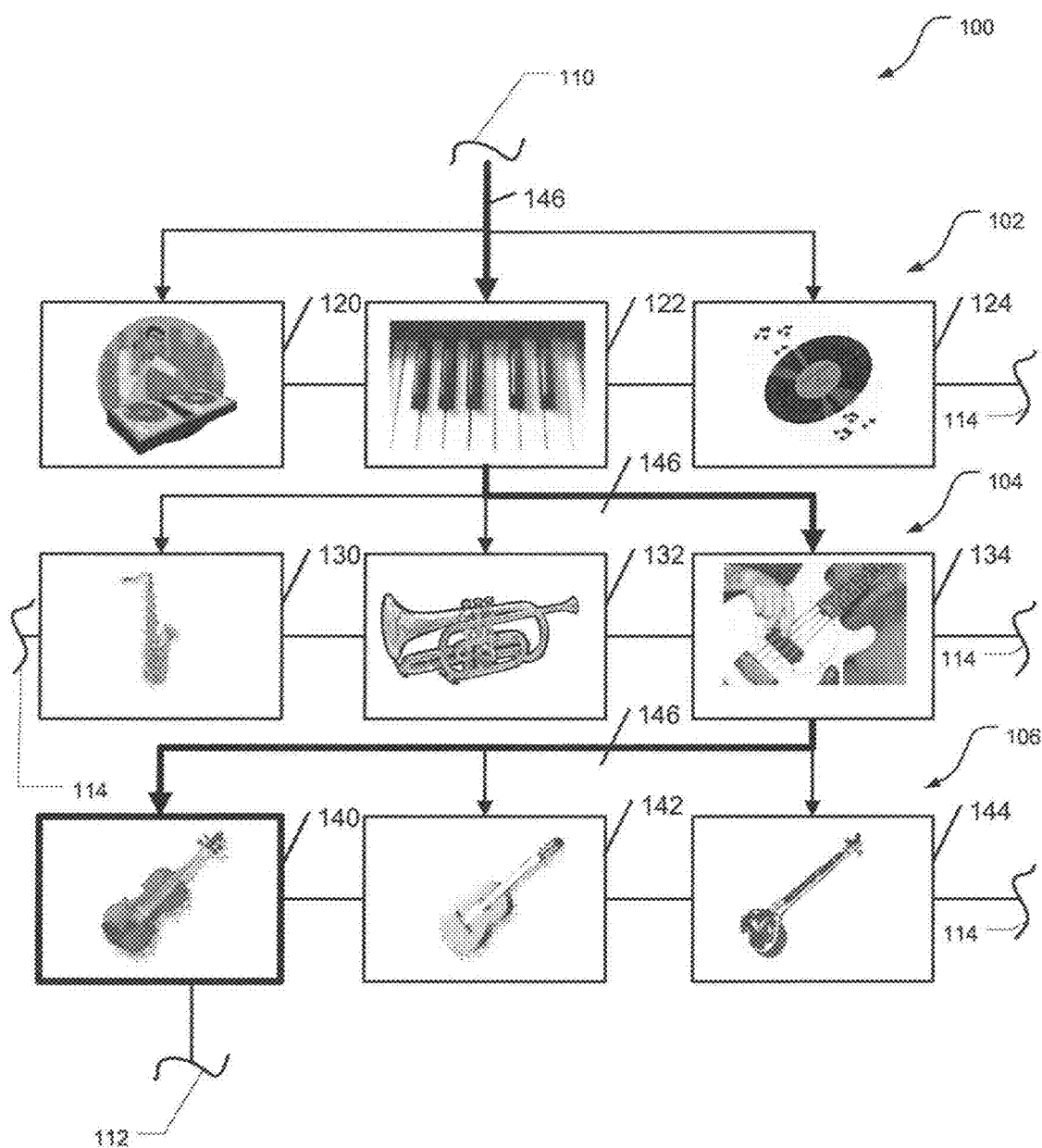
FIG. 1 is a diagram illustrating visible element navigation pathways according to various embodiments of the invention.

FIG. 1 is a diagram illustrating visible element navigation pathways 100 according to various embodiments of the invention. As shown, this is only one possible way, out of many, in which image information can be organized. The information displayed may represent items in an online store available for purchase, items in an online auction up for bid, a pictorial inventory, a virtual network of affiliated persons, a company directory, etc.

The particular organization shown in FIG. 1 is a representation of an online auction environment. Here a number of visible element navigation pathways 100 exist to provide connections between the visible images 120, 122, 124, 130, 132, 134, 140, 142, 144. A user can navigate along the pathways 100 by selecting any of the images shown. For example, it can be seen that three levels of items exist: a super-category 102, a category 104, and a sub-category 106. The level above the super-category 102 in this case might comprise a super-super-category 110 labeled "sound". The super-category 102 might then be labeled "music" (comprising visible images 120, 122, 124 which, when selected, permit navigation to the categories of live sound, instruments, and recorded sound, respectively).

Thus, if the image 122 (e.g., "instruments") is selected, the user can navigate to the next level or category 104 of instruments. This category 104 might comprise visible images 130, 132, 134 which, when selected, permit navigation to the categories of woodwinds, brass, and strings, respectively. If the image 134 (e.g., "strings") is selected, the user can navigate to the next level or sub-category 106 of stringed instruments. Selecting the visible image 140 may indicate a choice of navigating to a still lower level (e.g., sub-sub-category 112) of the "violin family".

It should be noted that each level 102, 104, 106 may comprise any number of images, as indicated by the cutoff symbols 114. There may also be any number of levels or categories 102, 104, 106, 110, 112. Due to space limitations, only a few are shown in FIG. 1 and the subsequent figures. Also, it should be noted that a user may navigate between levels, going higher or lower in the hierarchy, along the visible element navigation pathways 100. Thus, the bolded navigation path 146 is just one of many that can be selected.

In addition, while an auction environment is shown, many other environments can be implemented, including one that permits browsing across categories. For example, in some embodiments, a user might be able to browse tags associated with auction items, sellers of auction items, bidders, as well as the auction items themselves—all as part of an integrated set of visible element navigation pathways 100. Algorithms may be used to optimize the set of browsing path based on a user's browsing history. The order of image presentation along certain paths might then be weighted based on what is known about the user.

For example, users who buy a lot of digital video discs (DVDs) may start browsing at a level labeled "Star Wars." Since these users are known DVD shoppers, the thousands of possible directions along the visible element navigation pathways might be weighted to present DVD productions of Star Wars episodes, including sequels, and similar movies, prior to other possible paths (e.g., models of Star Wars vehicles, or robot kits). However, if the user is a known collectible shopper, the "Star Wars" level may lead more directly to entertainment memorabilia, collectables, etc.

As another example, assume that a user is known to purchase puzzles due to prior purchase history. And assume that the initial super-category of "Toys" has been selected by the user. If the user has purchased primarily cardboard cutout puzzles and 3D foam puzzles, these two categories may be presented as the proximate image choices at the next lower level or category of toys. The image size for the more favored puzzle types might also be displayed larger than those of less interest (e.g., smaller images displayed for less-favored string and wood puzzles, or word-based puzzles).

Categories of items, such as "Toys" are only one of many types of classification mechanisms that can be used to weight navigation along the visible element navigation pathways 100. For example, item attributes (e.g., size, color, weight, price, seller rating, etc.), and the user's previous history of color choices, can also be used to weight navigation pathway presentation. Thus, a user looking at the category of "Clothes" with a known preference for the color red, and a buying history of large sizes might be shown large, red shoes, dresses, and handbags before other items. The path weighted to favor a size eight shoe, for instance, might have a weight sloping away from size eight (e.g., sizes seven and nine) prior to showing sizes that are even farther away from the preferred size eight.

Tags are keywords that can be associated with a given object, typically an item, as another kind of classification (e.g., expensive toys, 60's rock and roll, etc.). While attributes are generally fixed (e.g., size of a ring, color of a sweater, length of a pool table), tags are more flexible. This is because tags may be assigned by a computer system, in an automated fashion (e.g., by analyzing keywords in an item description, appropriate tags may be selected), or by users. Users can even associate tags with themselves (e.g., friendly, grouchy, tall, short, etc.).

Thus, in some embodiments, dynamic multi-dimensional browsing permits not only traversing an item space, via categories or attributes, but also traversing similar items based on seller ratings, or seller geographic location (e.g., to minimize shipping time, or to permit personal package pickup).

Neighborhoods can also be used as a pathway traversal mechanism. Neighborhoods are areas or pages on a web site where users with common interests can join and participate in question and answer sessions, as well as post favorite items, guides, product reviews, photos, blogs, wikis, discussion threads, guest books, and searches. Other communal activities where users can congregate around a topic, like a professional sports team, collectors of antique toys, etc. are also included.

Users (e.g., buyers, sellers, bidders, employees, neighborhood members, etc.) can attach tags to themselves. Such self-assigned tags may include hobbies; favorite books, movies, and shows; gender; age; friends; trading partners. Users may also be associated with system-assigned tags, or tags arising out of profile information (e.g., geographic locations; feedback; items purchased; items sold; saved items; watched items; searches; price range of purchases; time and/or date of purchases; etc.).

Controls may be presented to a user to further focus or limit browsing. For example, a visual slider control might be used to select sizes, colors, price ranges, etc. In more complex embodiments, sliders may be used to weight presentations, so that, for example, sellers with a high trust rating are displayed ahead of sellers with a low trust rating. Buyers that have many purchases from a particular seller might be displayed before those with less experience. In some embodiments, the control (which may be something other than a slider, such as a knob or switch widget) can be used to broaden or narrow the number of items seen on any particular level. Such controls may also be used to select how relevant the presented items in each level are to the desired categories. Many other variations are possible.

Once an image of interest is located, a user can "thumbtack" it by selecting it in some way so that it can be saved. In this way, many items can be viewed, and those of interest can be selected and saved as part of a series or collection. Browsing can thus continue uninterrupted as the items are selected for saving. At a later time, the user can go back to revisit whatever was marked to save.

Users may also be permitted to indicate approval of items selected, or disapproval, to help optimize the browsing experience, so that characteristics of items approved are used to select other items further down in the search tree. Thus, some search paths may be prioritized, and others de-prioritized. In this way, not only browsing history, but explicit positive/negative feedback can be used to weight the paths presented for browsing.

Figure 2:
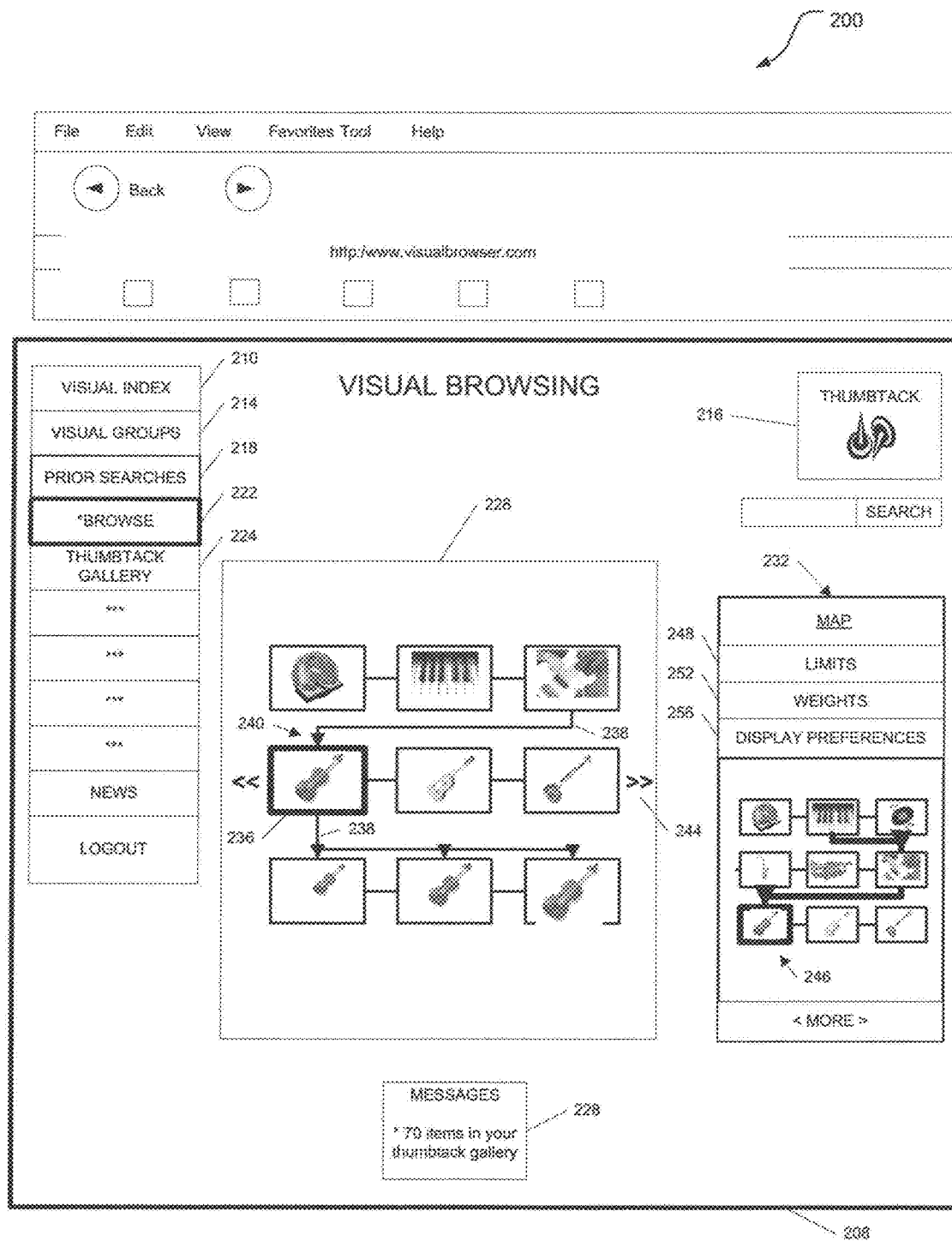
FIG. 2 is a simplified diagram of a graphical user interface to implement multi-dimensional dynamic visual browsing according to various embodiments of the invention.

FIG. 2 is a simplified diagram of a graphical user interface (GUI) 200 to implement multi-dimensional dynamic visual browsing according to various embodiments of the invention. The interface 200 is one of many that are possible. In the particular example of FIG. 2, a sample web page 208 that might be seen by an individual user logged into an Internet auction is shown.

Here, the "BROWSE" menu option 222 has been selected, calling up the VISUAL BROWSING page 208. This selection permits the user to enter into a multi-dimensional visual browsing environment. Other menu options might include choosing to view a visual index 210, visual categories or groups 214, visual representations of prior searches 218, or a thumbtack gallery 224 (see FIG. 3).

The visual portal 228 can be used to current path 238, as well as the item image 236 which was last selected. The existence of additional items at a particular level 240 can be indicated via arrows 244.

A mapping window 232 may be used to display a reduced size map 246 of the visual browsing portal content 228. The map 246 can help to orient the user as to their position within a higher-level overview of the visible element navigation pathways. Several user preference options, such as limits 248 on the browsing experience (where specific categories, tags, neighborhoods, and other data can be selected to exclude or include certain search paths), visual element and path presentation factor weights 252, and other display preferences 256 (e.g., how many visual elements to display at once in the portal 228) can be selected.

When images 236 are selected for saving, a thumbtack icon 216 may be activated, so that whenever the icon 216 is active, clicking on an image 236 marks the image for saving as part of a thumbtack gallery collection. In some embodiments, a message field 228 in the GUI 200 may be used to inform the user how many items have been thumbtacked, or when the last search was conducted, etc.

Figure 3:
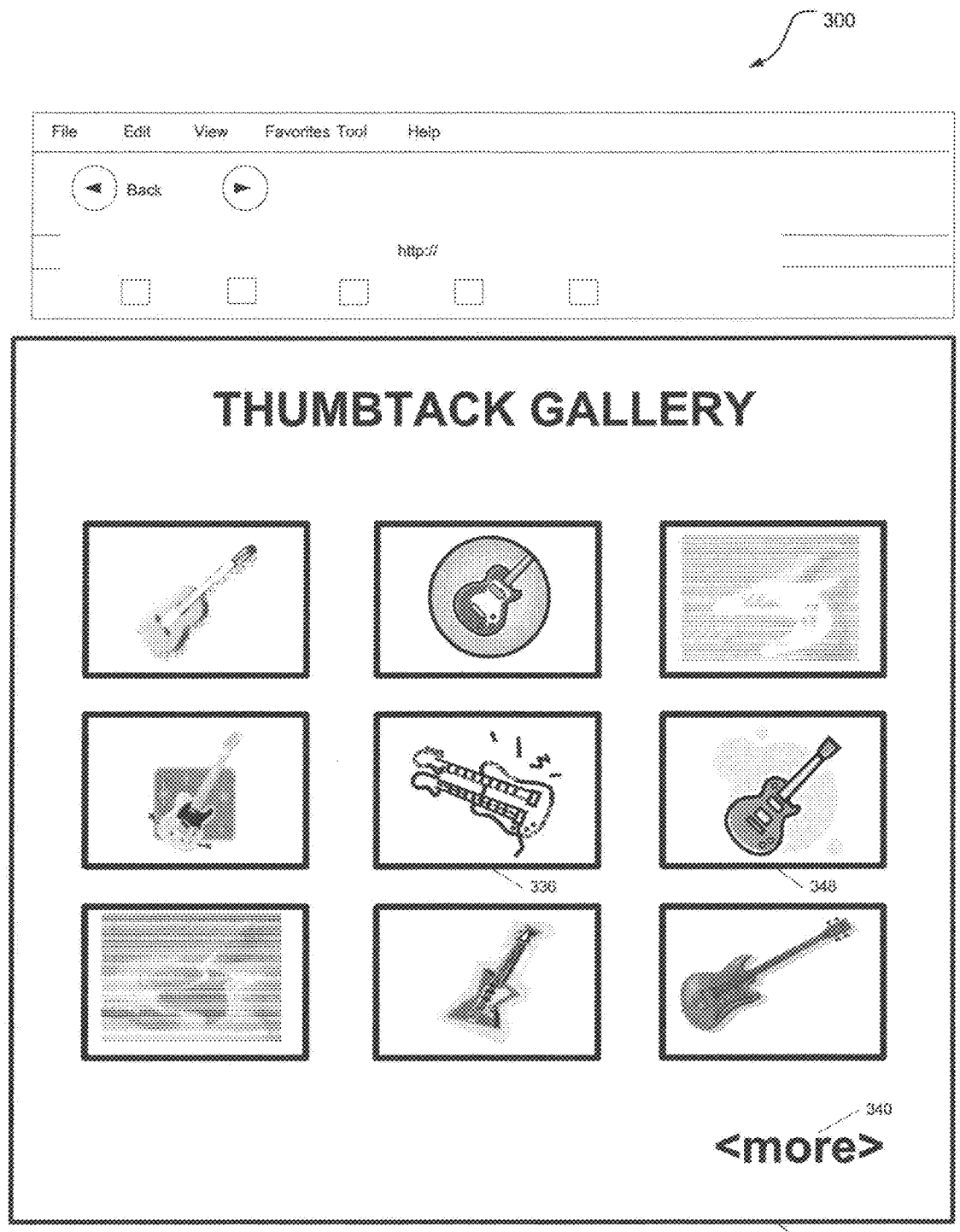
FIG. 3 is a diagram illustrating a visual element thumbtack gallery according to various embodiments of the invention.

FIG. 3 is a diagram illustrating a visual element thumbtack gallery 328 according to various embodiments of the invention. The GUI 300 shown is just one of many that are possible. In the particular example of FIG. 3, a sample of what might be seen by a user that has logged into a web site of an Internet museum having a collection of instruments is shown.

For example, in this particular wing of the museum, a number of guitars are shown. The images 336, 348 allow the user to distinguish between an Epiphone G1275 Custom Double Neck Guitar and Gibson Les Paul Studio Electric guitar, respectively. Selecting any image in particular, such as the image 336 may have the effect of permitting the user to navigate to that point in the visible element navigational pathways where the item was originally located. Additional images that have been marked for saving (or "thumbtacked") can be accessed by clicking on the <more> widget 340.

Example Apparatus and Systems

Figure 4:
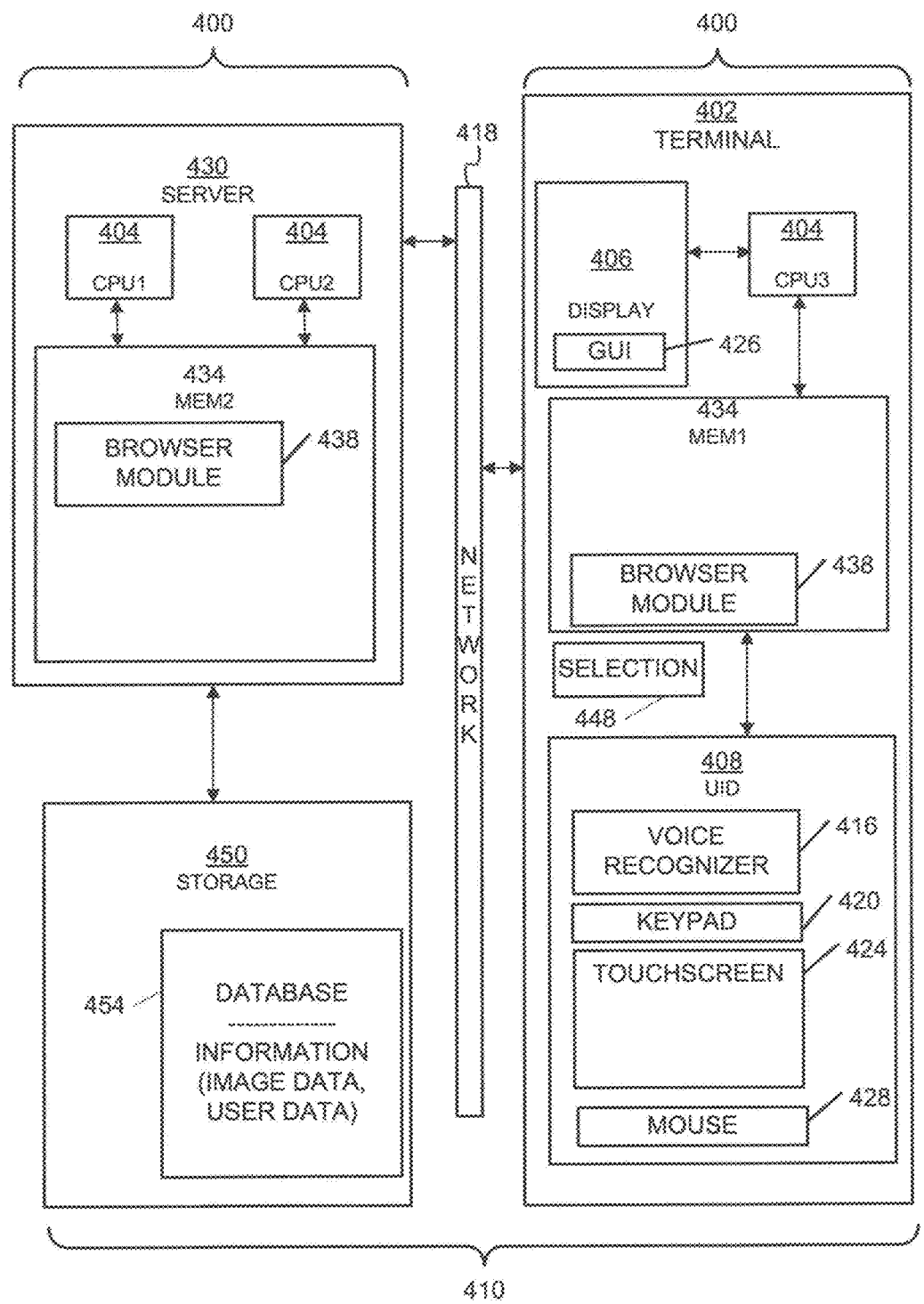
FIG. 4 is a block diagram of apparatus and systems according to various embodiments of the invention.

FIG. 4 is a block diagram of apparatus 400 and systems 410 according to various embodiments of the invention. The apparatus 400 may comprise many devices, such as a terminal 402, a server 430, a generic computer, or other devices with computational capability.

The apparatus 400 may include one or more processors 404 coupled to a memory 434. Selections 448, such as those made by a user with respect to a visual image encountered during multi-dimensional visual browsing, may be received by the apparatus 400 and stored in the memory 434, and/or processed by a combination of the processor 404 and the browser module 438. Thus, many embodiments may be realized.

For example, an apparatus 400 to accomplish visual browsing may comprise a browser module 438 to navigate along a plurality of visible element navigations pathways forming a portion of an online marketplace and a display 406 to present a first plurality of visible images indicating a corresponding group of the plurality of visible element navigation pathways associated with a first level of the online marketplace. An online marketplace may comprise an online auction environment, an online retail or wholesale purchase environment, or any other online environment where goods and/or services are made available for purchase.

The apparatus 400 may also include one or more user input devices 408 to receive a selection of one of the first plurality of visual images to provide a selected image, and a processor 404 to navigate to a second level of the online marketplace along the visible element navigation pathways by presenting, on the display 406, a second plurality of visible images representing a super-category including the selected image, or a sub-category included in the selected image, wherein the first and second levels form part of at least three levels of visual navigation.

The browser module 438 may comprise a concrete application, a thin client, or other software and/or firmware to interface with a networked online marketplace. The user input device 408 may comprise one or more of a voice recognizer 416, a keyboard or keypad 420, a touch screen 424, or a mouse 428. The display 406 and/or the touchscreen 424 may be used to display one or more GUIs 426, such as those shown in FIGS. 2 and 3.

The apparatus 400 may comprise a GUI 426 to couple to the browser module 438. The GUI 426 may be used to arrange a presentation of the first plurality of visible images and the second plurality of visible images, wherein at least one member from the first plurality of visible images is displayed on the display at the same time as the second plurality of visible images. Thus, the user can view what has been selected from a prior level, along with images on the current level. In some embodiments, the user can view the current level and the next lower level. In other embodiments, any number of levels may be viewed.

A system 410 to enable visual browsing may include one or more of the apparatus 400, such as one or more terminals 402, and one or more servers 430. The terminals 402 may take the form of a desktop computer, a laptop computer, a cellular telephone, a point of sale (POS) terminal, and other devices that can be coupled to the server 430 via a network 418. Terminals 402 may include one or more processors 404, and memory 434. The network 418 may comprise a wired network, a wireless network, a local area network (LAN), or a network of larger scope, such as a global computer network (e.g., the Internet). Thus, the terminal 402 may comprise a wireless terminal. Each of the servers 430 and terminals 402 may be used to select images encountered during multi-dimensional visual browsing, as shown in FIG. 2. Thus, selections 448 may be originated at the server 430 and/or the terminals 402.

Therefore, many embodiments may be realized. For example, a system 410 may comprise any one or more components of the terminal 402, including a browser module 438 to navigate along a plurality of visible element navigations pathways forming a portion of an online marketplace. The browser module 438 may be located entirely within the apparatus 400, the server 430, or divided between the apparatus 400 and the server 430.

Thus, the system 410 may comprise a client computer (e.g., terminal 402) including a display 406 to present a first plurality of visible images indicating a corresponding group of the plurality of visible element navigation pathways associated with a first level of the online marketplace. The system 410 may comprise one or more user input devices 408, as well as a server 430 to store at least one of the first plurality of visible images and the second plurality of visible images. Any one of the processors 404 may operate as described with respect to the apparatus 400 above. The server 430 may comprise a plurality of computers coupled to a global computer network (e.g., the Internet). Storage in conjunction with server 430 operations may be accomplished using the memory 434, the storage unit 450, or both. One or more databases 454 may be maintained by the server 430 to track presentation factor weighting, images and associated information, user activity history, and other information.

Example Methods

Figure 5:
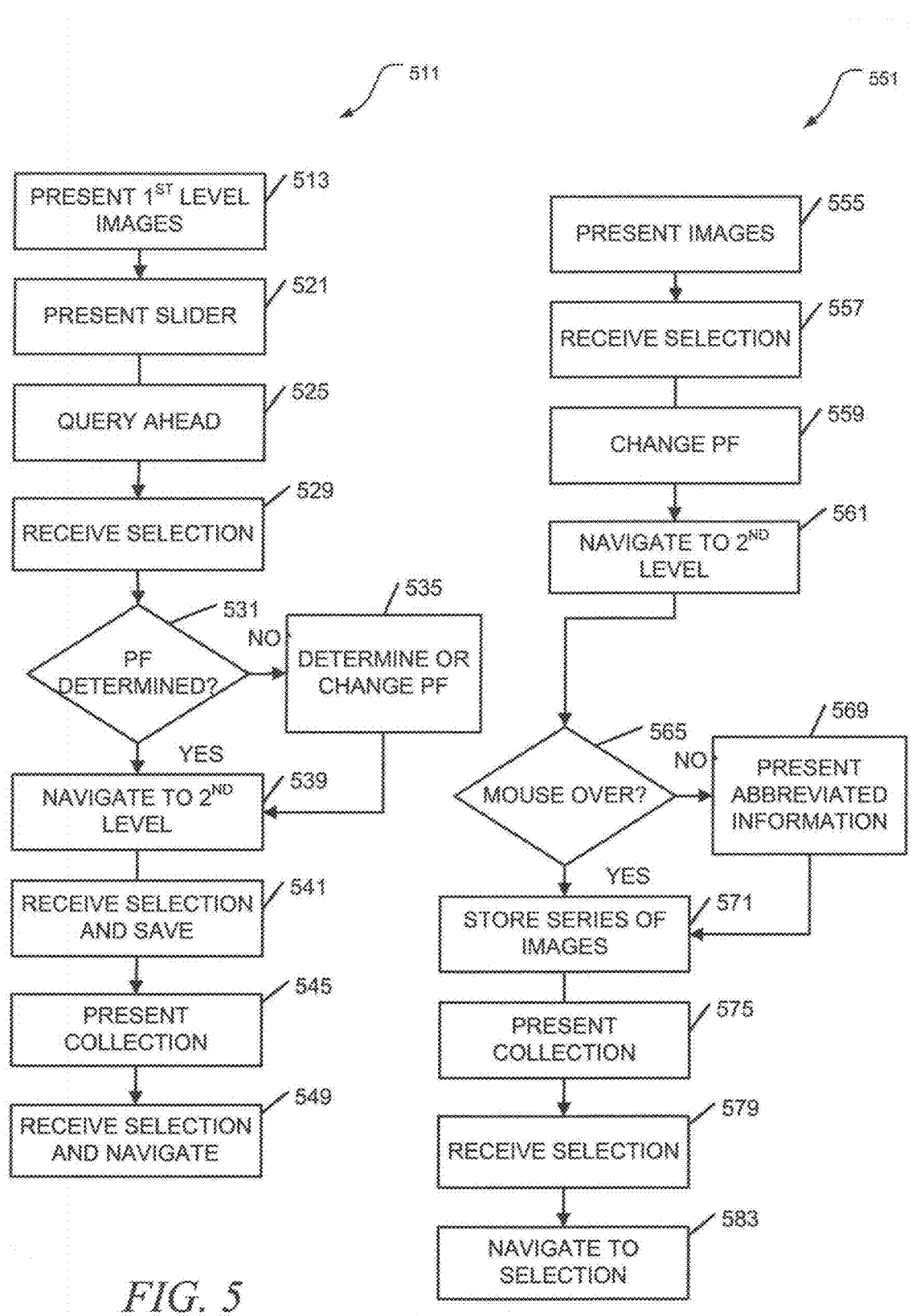
FIG. 5 is a flow diagram illustrating methods of multi-dimensional dynamic visual browsing according to various embodiments of the invention.

FIG. 5 is a flow diagram illustrating methods 511, 551 of multi-dimensional dynamic visual browsing according to various embodiments of the invention. For example, a computer-implemented method 511 to implement multi-dimensional visual browsing may begin at block 513 with presenting a first plurality of visible images indicating a corresponding group of visible element navigation pathways associated with a first level of an online marketplace.

The method 511 may go on to block 521 with presenting a visual slider mechanism having a plurality of positions to indicate a selected relevance level associated with the visible element navigation pathways, the second plurality of visible images, or both. This enables users to control the level of image relevance during their browsing experience.

For example, a slider widget may be used during the browse experience to control the specificity of relevance in the browse path. One implementation of the slider might be as a "camera aperture setting". The user can specify that they want to see only images that are highly relevant, versus a broader view that encompasses items that are less relevant. The aperture setting can permit the user to cull items when too many are presented for comfortable browsing, or to be more inclusive when fewer items are available. For example, users that search for and buy video games may tend to search and buy DVDs—so a slider can be used to narrow the DVDs that are found down to only those having video games, or to broaden the search to include other types of software on DVDS, or even more broadly, to any type of content, such as music videos available via DVD. Essentially, the slider can control how tightly or loosely affiliated new items in the browse path will be when compared to prior selections. It should be noted that a slider may comprise a visual representation of a conventional sliding mechanism, such as a linear potentiometer, or any other type of control that allows selection of multiple choices, such as a visual representation of a knob, a multi-pole switch, a dial, etc. The slider can thus be used to control relevance during visual browsing, or simply to select one item from among several in a given level or group.

The method 511 may go on to block 525 to include asynchronously querying ahead of the current selection along the visible element navigation pathways. Given the massive amounts of data and queries to a database that may be involved when multi-dimensional visual browsing is implemented, various embodiments may operate to query ahead of the current user selection while browsing occurs. This can enable a smoother browsing experience at a given level, while data for subsequent potential paths is retrieved ahead of the next user selection.

The method 511 may thus include receiving a selection of one of the first plurality of visual images to provide a selected image at block 529. It should be noted that the display of nodes in the browse path may change based on the type of objects or images that are selected. For example, items available for purchase may simply be displayed as a static or moving picture representation of the object. In other cases, where the category of items changes (e.g., from perishable food items to musicians available to play in a band), the picture of the musician alone may not provide enough information to the user. In that case, the musician and their instrument may be displayed, perhaps in conjunction with a stage name. In the instance where images of sellers are shown, perhaps a group of items typically sold will be pictured in conjunction with an image of the seller. Brand icons, tags associated with the seller (e.g., rating), and/or other information may be displayed as well.

In some embodiments, the method 511 may include making a determination as to whether a presentation factor has been established at block 531. A presentation factor can be used to weight the presentation of images along the visible element navigation pathways, as described above. Thus, the first plurality of visual images and the second plurality of visual images can be presented in an order weighted according to one or more presentation factors, which may in turn be taken from elements included in item categories, item attributes, and item tags associated with a determined user preference and/or an expressed user preference. A determined user preference is established based on user browsing history (e.g., prior purchases, size, price range, etc.), whereas an expressed user preference is provided by the user to weight image presentations according to the expressed desire of the user (e.g., user profile information, slider input, etc.).

Thus, presentation factors can be taken from a wide range of data, including one or more elements included in user profiles, user activity history, the activity history of others, user interaction history, the interaction history of others, and community interaction history. Profile elements may be included in the user profiles (entered by the user). User activity history may include a collection of user activity/choices saved by the system (e.g., transaction history (categories with repeat purchases, categories with the most watched items, etc.)). The activity history of others includes presenting images according to the popularity of visual paths navigated by others (e.g., weighting according to the pre-dominant paths in a collection of paths chosen by others). User interaction history can include a collection of interactions between users (e.g., email threads, ratings, etc.) saved by the system. Community interaction history may include a collection of interactions between the user and various neighborhoods (e.g., blogs). These latter presentation factors may be useful for browsing images of users and/or neighborhoods.

In every case, one or more presentation factors may be determined or changed at block 535 if none have been established, or if currently-established presentation factors are to be revised. Thus, the method 511 may include receiving a presentation factor to weight the order of presentation of either the first plurality of visual images, the second plurality of visual images, or both. The value and type of presentation factors may be changed at any time, including changing the type of one or more presentation factors according to the current location of a user selection along the visible navigation pathways. The presentation factor can also be changed to reflect association with the visual presentation order weighting from a series of stored selections (e.g., prior selections). That is, the weighting of the image presentation order can change according to the particular location a user occupies on the navigation pathways, or according to the prior paths taken to arrive at a particular location, or both.

In most embodiments, the method 511 includes, at block 539, navigating to a second level of the online marketplace along the visible element navigation pathways by presenting a second plurality of visible images representing one of a super-category including the selected image and a sub-category included in the selected image, wherein the first and second levels form part of at least three levels of visual navigation. The selected image may be presented as one or more of an item, a user, and a neighborhood forming a portion of an online marketplace.

The method 511 may go on to include receiving a user selection of one or more of the second plurality of visible images, and perhaps saving the user selection as part of a collection of user selections (e.g., when thumbtacks are used) at block 541. The method 511 may go on to include presenting the collection of user selections on a display at block 545, which may include viewing a collection of thumbtacks. Once a collection is displayed, the method 511 may include, at block 549, receiving a user selection of an item included in the collection of user selections, and navigating to a location on the visible navigation pathways corresponding to the user selection by presenting detailed descriptive information about the user selection. The amount of information presented may be more or less than that available from a "mouse over" action, which includes a user acting to hover an on-screen pointer over an image displayed on the screen. Still other embodiments may be realized.

For example, some computer-implemented methods 551 of multi-dimensional visual browsing include presenting at least one of a first plurality of visual images and a second plurality of visual images in an order weighted according to at least one presentation factor at block 555. The method 551 may continue on to block 557 with receiving a selection of one of the first plurality of visual images to provide a selected image, wherein the first plurality of images indicate a corresponding group of visible element navigation pathways associated with a first level of an online marketplace. The group of navigation pathways may lead to presenting images of one or more of items (e.g., products, services), users (e.g., buyers, sellers), and neighborhood communities, perhaps forming a portion of an online marketplace.

Thus, the notion of browsing across related or different data types is included in some embodiments. For example, a user may begin by browsing items in a given category, navigating to products (e.g., catalog entries that are unique to a given part number, etc.). From products, the user might navigate to sellers of products, and from sellers of products, to tags associated with sellers, and from tags to neighborhoods associated with the tags, and so on.

In some embodiments, the method 551 may include changing the value of at least one presentation factor according to the location along the visible navigation pathways, so that the amount of weight changes based on path selections or current location, at block 559.

The method 551 may go on to block 561 to include navigating to a second level of the online marketplace along the visible element navigation pathways by presenting a second plurality of visible images representing a sub-category included in the selected image, wherein the first and second levels form part of at least three levels of visual navigation.

If the user makes use of a mouse over action to hover an on-screen pointer on a selected image, as determined at block 565, then the method 551 may include, as shown in block 569, presenting abbreviated descriptive information regarding at least one of the second plurality of visible images in response to a mouse over action selecting the at least one of the second plurality of visible images.

In many embodiments, such as those making use of thumbtack operations, the method 551 may include, as shown in block 571, storing a series of images forming a portion of the visible element navigation pathways as individual ones of the series are selected. The individual ones of the series may correspond to items, users, and/or communities forming part of the online marketplace. Additional information may be stored as well, such as any and all data associated with selected images (e.g., tags, location along the navigation pathways, the identity of the user making the selection, etc.).

The method 551 may go on to include presenting the series of images as a collection of images at block 575, receiving a selection of one of the collection to provide a single image at block 579, and navigating to a location on the visible navigation pathways corresponding to the single image by presenting detailed descriptive information about the single image at block 583. Thus, images that have been saved using thumbtacks can be recalled as a collection, and selected individually for review.

The methods 511, 551 described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, the methods described herein may be performed by processing logic that comprises hardware (e.g., dedicated logic, programmable logic), firmware (e.g., microcode, etc.), software (e.g., algorithmic or relational programs run on a general purpose computer system or a dedicated machine), or any combination of the above. It should be noted that the processing logic may reside in any of the modules described herein.

Therefore, other embodiments may be realized, including a machine-readable medium (e.g., the memories 434 of FIG. 4) encoded with instructions for directing a machine to perform operations comprising any of the methods described herein. For example, some embodiments may include a machine-readable medium encoded with instructions for directing a server or client terminal or computer to perform a variety of operations. Such operations may include any of the activities presented in conjunction with the methods 511, 551 described above. Various embodiments may specifically include a machine-readable medium comprising instructions, which when executed by one or more processors, cause the one or more processors to perform any of the activities recited by such methods.

Marketplace Applications

Figure 6:
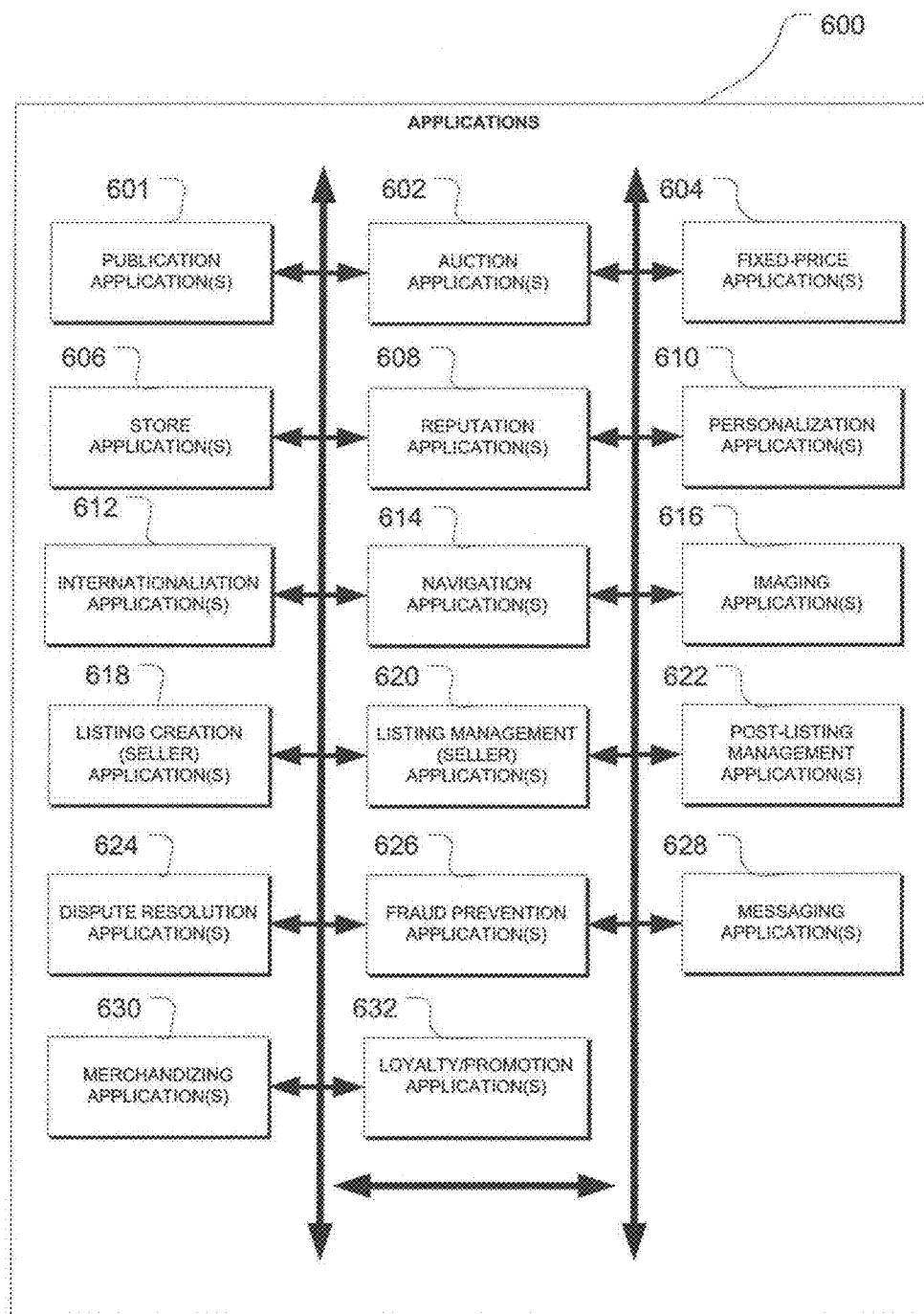
FIG. 6 is a block diagram illustrating applications that can be used in conjunction with multi-dimensional dynamic visual browsing according to various embodiments of the invention.

FIG. 6 is a block diagram illustrating applications 600 that can be used in conjunction with multi-dimensional dynamic visual browsing according to various embodiments of the invention. These applications 600 can be provided as part of a networked system, including the systems 410 and 700 of FIGS. 4 and 7, respectively. The applications 600 may be hosted on dedicated or shared server machines that are communicatively coupled to enable communications between server machines. Thus, for example, any one or more of the applications may be stored in memories 434 of the system 410, and/or executed by the processors 404, as shown in FIG. 4.

The applications 600 themselves are communicatively coupled (e.g., via appropriate interfaces) to each other and to various data sources, so as to allow information to be passed between the applications or so as to allow the applications to share and access common data. The applications may furthermore access one or more databases via database servers (e.g., database server 724 of FIG. 7). Any one or all of the applications 600 may serve as a source of images, associated information, and presentation factors for processing image data according to the methods described herein. The applications 600 may also serve as a source of determined user preferences and/or expressed user preferences.

In some embodiments, the applications 600 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the applications 600 may include a number of marketplace applications, such as at least one publication application 601 and one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 606 allow a seller to group listings within a "virtual" store, which may be branded and otherwise personalized by and for the seller. Such a virtual store may also offer promotions, incentives and features that are specific and personalized to a relevant seller.

Reputation applications 608 allow users that transact business, perhaps utilizing a networked system, to establish, build and maintain reputations, which may be made available and published to potential trading partners. When, for example, a networked system supports person-to-person trading, users may otherwise have no history or other reference information whereby the trustworthiness and credibility of potential trading partners may be assessed. The reputation applications 608 allow a user, through feedback provided by other transaction partners, to establish a reputation within a networked system over time. Other potential trading partners may then reference such reputations for the purposes of assessing credibility and trustworthiness.

Personalization applications 610 allow users of networked systems to personalize various aspects of their interactions with the networked system. For example a user may, utilizing an appropriate personalization application 610, create a personalized reference page at which information regarding transactions to which the user is (or has been) a party may be viewed. Further, a personalization application 610 may enable a user to personalize listings and other aspects of their interactions with the networked system and other parties.

Marketplaces may be customized for specific geographic regions. Thus, one version of the applications 600 may be customized for the United Kingdom, whereas another version of the applications 600 may be customized for the United States. Each of these versions may operate as an independent marketplace, or may be customized (or internationalized) presentations of a common underlying marketplace. The applications 600 may accordingly include a number of internationalization applications 612 that customize information (and/or the presentation of information) by a networked system according to predetermined criteria (e.g., geographic, demographic or marketplace criteria). For example, the internationalization applications 612 may be used to support the customization of information for a number of regional websites that are operated by a networked system and that are accessible via respective web servers.

Navigation of a networked system may be facilitated by one or more navigation applications 614. For example, a search application (as an example of a navigation application) may enable key word searches of listings published via a networked system publication application 601. A browse application may allow users to browse various category, catalogue, or inventory data structures according to which listings may be classified within a networked system. Various other navigation applications may be provided to supplement the search and browsing applications, including the multi-dimensional dynamic visual browsing applications described herein.

In order to make listings available on a networked system as visually informing and attractive as possible, marketplace applications may operate to include one or more imaging applications 616 which users may use to upload images for inclusion within listings. An imaging application 616 can also operate to incorporate images within viewed listings. The imaging applications 616 may also support one or more promotional features, such as image galleries that are presented to potential buyers. For example, sellers may pay an additional fee to have an image included within a gallery of images for promoted items.

Listing creation applications 618 allow sellers conveniently to author listings pertaining to goods or services that they wish to transact via a networked system, and listing management applications 620 allow sellers to manage such listings. Specifically, where a particular seller has authored and/or published a large number of listings, the management of such listings may present a challenge. The listing management applications 620 provide a number of features (e.g., auto-relisting, inventory level monitors, etc.) to assist the seller in managing such listings. One or more post-listing management applications 622 can assist sellers with activities that typically occur post-listing. For example, upon completion of an auction facilitated by one or more auction applications 602, a seller may wish to leave feedback regarding a particular buyer. To this end, a post-listing management application 622 may provide an interface to one or more reputation applications 608, so as to allow the seller conveniently to provide feedback regarding multiple buyers to the reputation applications 608.

Dispute resolution applications 624 provide mechanisms whereby disputes arising between transacting parties may be resolved. For example, the dispute resolution applications 624 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 626 implement fraud detection and prevention mechanisms to reduce the occurrence of fraud within a networked system.

Messaging applications 628 are responsible for the generation and delivery of messages to users of a networked system, such messages for example advising users regarding the status of listings on the networked system (e.g., providing "outbid" notices to bidders during an auction process or to provide promotional and merchandising information to users). Respective messaging applications 628 may utilize any number of message delivery networks and platforms to deliver messages to users. For example, messaging applications 628 may deliver electronic mail (e-mail), instant message (IM), Short Message Service (SMS), text, facsimile, or voice (e.g., Voice over IP (VoIP)) messages via wired (e.g., Ethernet, Plain Old Telephone Service (POTS)), or wireless (e.g., mobile, cellular, WiFi, WiMAX) networks.

Merchandising applications 630 support various merchandising functions that are made available to sellers to enable sellers to increase sales via a networked system. The merchandising applications 630 also operate the various merchandising features that may be invoked by sellers, and may monitor and track the success of merchandising strategies employed by sellers.

A networked system itself, or one or more users that transact business via the networked system, may operate loyalty programs that are supported by one or more loyalty/ promotions applications 632. For example, a buyer may earn loyalty or promotions points for each transaction established and/or concluded with a particular seller, and be offered a reward for which accumulated loyalty points can be redeemed.

Figure 7:
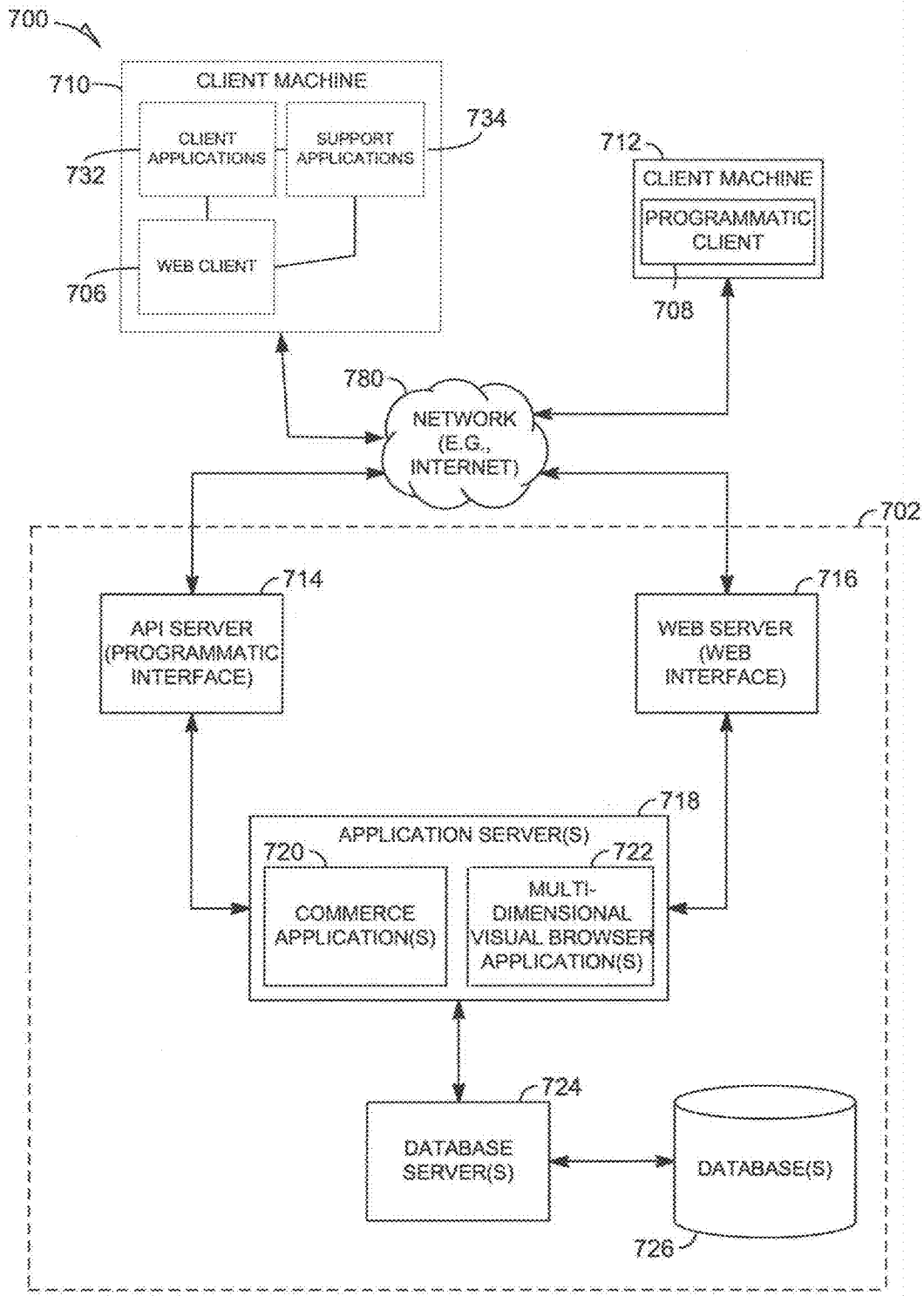
FIG. 7 is a block diagram illustrating a client-server architecture to implement multi-dimensional dynamic visual browsing according to various embodiments of the invention.

FIG. 7 is a block diagram illustrating a client-server architecture to implement multi-dimensional dynamic visual browsing according to various embodiments of the invention, including any of the methods described herein. A platform, such as a network-based information management system 702, provides server-side functionality via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In some embodiments, either or both of the web client 706 and programmatic client 708 may include a mobile device.

Turning specifically to the system 702, an Application Program Interface (API) server 714 and a web server 716 are coupled to, and provide programmatic and web interfaces respectively to, one or more application servers 718. The application servers 718 host one or more commerce applications 720 (e.g., similar to or identical to the applications 600 of FIG. 6) and multi-dimensional visual browsing applications 722 (e.g., similar to or identical to the browser modules 438 of FIG. 4). The application servers 718 are, in turn, shown to be coupled to one or more database servers 724 that facilitate access to one or more databases 726 (similar to or identical to the database 454 of FIG. 4), such as registries that include links between individuals, their profiles, their behavior patterns, user-generated information, topical ranks, and signatures.

Further, while the system 700 employs a client-server architecture, the various embodiments are of course not limited to such an architecture, and could equally well be applied in a distributed, or peer-to-peer, architecture system. The various applications 720 and 722 may also be implemented as standalone software programs, which do not necessarily have networking capabilities.

The web client 706, it will be appreciated, may access the various applications 720 and 722 via the web interface supported by the web server 716. Similarly, the programmatic client 708 accesses the various services and functions provided by the applications 720 and 722 via the programmatic interface provided by the application programming interface (API) server 714. The programmatic client 708 may, for example, comprise a browser module (e.g., similar to or identical to the browser module 438 of FIG. 4) to enable a user to submit selections of items, perhaps performing batch-mode communications between the programmatic client 708 and the network-based system 702. Client applications 732 and support applications 734 may perform similar or identical functions.

Example Machine Architecture

Figure 8:
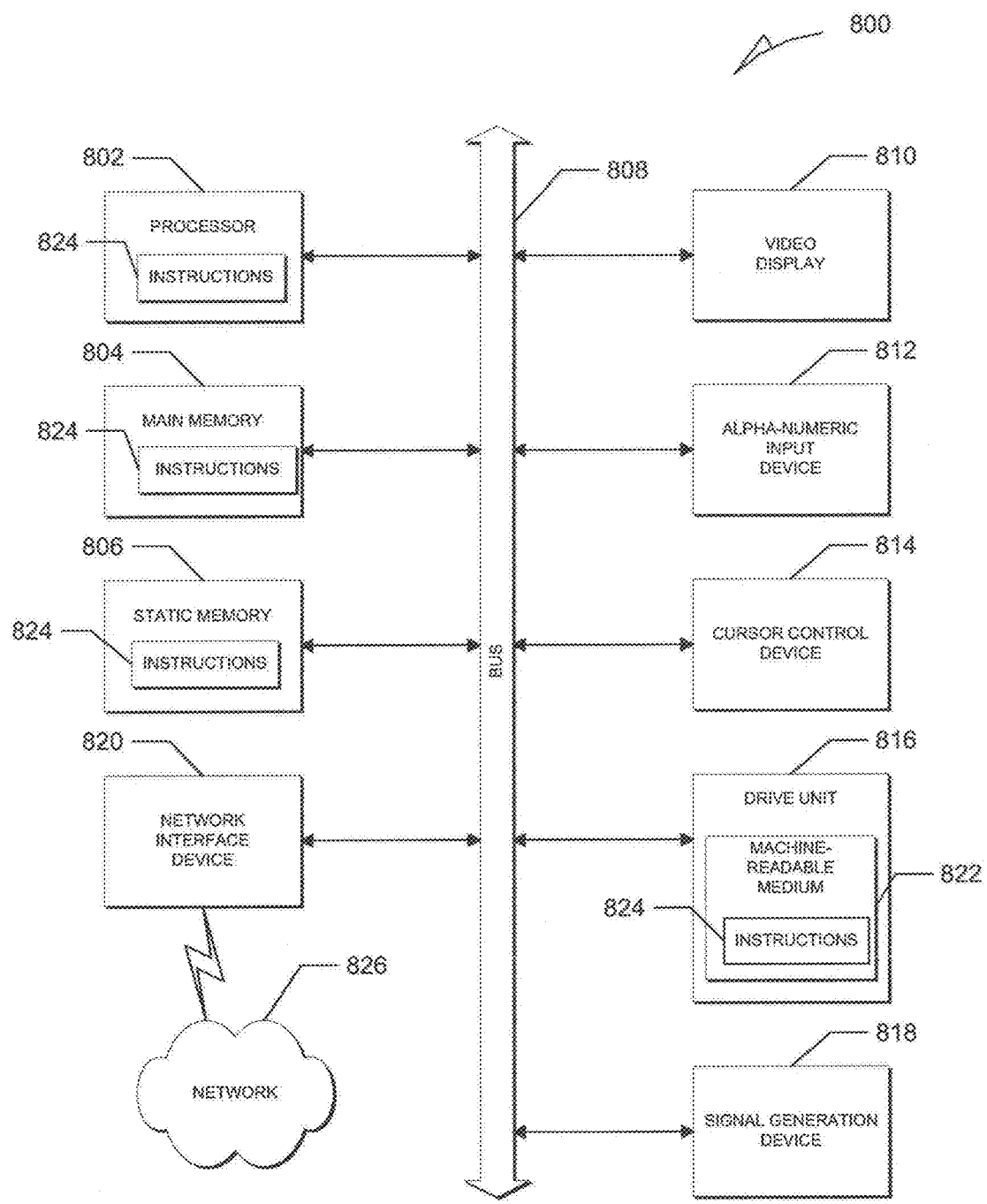
FIG. 8 is a block diagram of a machine in the example form of a computer system according to various embodiments of the invention.

FIG. 8 is a block diagram of a machine 800 in the example form of a computer system according to various embodiments of the invention. The computer system may include a set of instructions for causing the machine to perform any one or more of the methodologies discussed herein. The machine 800 may also be similar to or identical to the terminal 402 or server 430 of FIG. 4.

In some embodiments, the machine 800 may operate as a standalone device or may be connected (e.g., networked) to other machines. In a networked deployment, the machine 800 may operate in the capacity of a server or a client machine in a server-client network environment, or as a peer machine in a peer-to-peer (or distributed) network environment.

The machine 800 may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, all of which communicate with each other via a bus 808. The computer system 800 may further include a video display unit 810 (e.g., liquid crystal displays (LCD) or cathode ray tube (CRT)). The display unit 810 may be used to display a GUI according to the embodiments described with respect to FIGS. 2 and 3. The computer system 800 also may include an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 may include a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media. The software 824 may further be transmitted or received over a network 826 via the network interface device 820, which may comprise a wired and/or wireless interface device.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories, optical, and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

In conclusion, it can be seen that various embodiments of the invention can operate to present a unique exploration experience to a user accessing large quantities of information. The embodiments disclosed can present a multi-dimensional visual browsing alternative to more conventional keyword-based searching mechanisms, perhaps permitting those of different nationalities or educational levels to access the same data in a similar manner. Increased user satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
identifying, by a processor of a machine, based on prior browsing history by a user and user preferences selected by the user for limiting a browsing experience to a selected relevance level, a plurality of categories of items of an online marketplace, the plurality of categories being a subset of categories included in a super-category;
presenting to the user in a visual browsing portal of the browsing experience:
a super-category image including a visual element and representing the super-category; and
a plurality of category images, each category image of the plurality of category images being different from the other category images of the plurality of category images and corresponding to a respective category of the plurality of categories, each category image including a respective visual element, wherein the visual element of the super-category image and the respective visual element of the included in each category image are configured as visual element navigation pathways to the categories included in the super-category in which one or more visual characteristics of the visual element navigation pathways are based on a weighting of the plurality of categories and additional categories according to the prior browsing history and the selected relevance level of the user preferences, and wherein the plurality of category images presented to the user are a subset of additional category images corresponding to additional categories included in the super-category and are selected from the super-category for presentation to the user by the weighting,
wherein the super-category image and the category images are presented to the user without text describing the super-category or the categories; and
presenting to the user a reduced size map of the visual browsing portal content simultaneously with the visual browsing portal, the reduced size map comprising a high-level overview of a visible element navigation pathway of the super-category and the plurality of categories.

2. The method of claim 1, wherein each category image has a size, the size of each category image based on the prior browsing history of the user.

3. The method of claim 1, further comprising:
detecting a mouse over action for the super-category image or one of the category images; and
presenting information about the category or super-category associated with the moused over image.

4. The method of claim 1, further comprising:
detecting a selection of the super-category image or one of the category images; and navigating to the super-category or category represented by the selected image.

5. The method of claim 1, wherein:
the presenting of the plurality of category images presents the plurality of category images in an order, the order being based on information about the user.

6. The method of claim 1, wherein:
each category of the plurality of categories is associated with a seller; and the presenting of each category image includes presenting a rating of the associated seller.

7. The method of claim 1, wherein the identifying of the plurality of categories is based on prices of prior items viewed by the user.

8. The method of claim 1, wherein the identifying of the plurality of categories is based on sizes of prior items viewed by the user.

9. The method of claim 1, wherein the identifying of the plurality of categories is based on prior items added to a watch list by the user.

10. The method of claim 1, wherein the identifying of the plurality of categories is based on a geographic location of the user.

11. The method of claim 1, further comprising:
detecting a selection of the super-category image or one of the category images; and saving, in a collection, the category or super-category represented by the selected image.

12. The method of claim 11, further comprising:
receiving a request to display the collection; and displaying the selected image.

13. The method of claim 1, further comprising: presenting to the user an option to approve or disapprove of each category.

14. The method of claim 13, wherein:
detecting an activation of a disapproval option for a disapproved category; and replacing the category image representing the disapproved category with a category image representing another category.

15. A system comprising:
a memory; and
a processor coupled to the memory and configured to perform operations comprising:
identifying, by a processor of a machine, based on prior browsing history by a user and user preferences selected by the user for limiting a browsing experience to a selected relevance level, a plurality of categories of items of an online marketplace, the plurality of categories being a subset of categories included in a super-category;
presenting to the user in a visual browsing portal of the browsing experience:
a super-category image including a visual element and representing the super-category; and
a plurality of category images, each category image of the plurality of category images being different from the other category images of the plurality of category images and corresponding to a respective category of the plurality of categories, each category image including a respective visual element, wherein the visual element of the super-category image and the respective visual element of the included in each category image are configured as visual element navigation pathways to the categories included in the super-category in which one or more visual characteristics of the visual element navigation pathways are based on a weighting of the plurality of categories and additional categories according to the prior browsing history, and wherein the plurality of category images presented to the user are a subset of additional category images corresponding to additional categories included in the super-category,
wherein the super-category image and the category images are presented to the user without text describing the super-category or the categories; and
presenting to the user a reduced size map of the visual browsing portal content simultaneously with the visual browsing portal, the reduced size map comprising a high-level overview of a visible element navigation pathway of the super-category and the plurality of categories.

16. A non-transitory machine-readable storage medium comprising instructions that, in response to being executed by one or more processors of a machine, cause the machine to perform operations comprising:
identifying, by a processor of a machine, based on prior browsing history by a user and user preferences selected by the user for limiting a browsing experience to a selected relevance level, a plurality of categories of items of an online marketplace, the plurality of categories being a subset of categories included in a super-category;
presenting to the user in a visual browsing portal of the browsing experience:
a super-category image including a visual element and representing the super-category; and
a plurality of category images, each category image of the plurality of category images being different from the other category images of the plurality of category images and corresponding to a respective category of the plurality of categories, each category image including a respective visual element, wherein the visual element of the super-category image and the respective visual element of the included in each category image are configured as visual element navigation pathways to the categories included in the super-category in which one or more visual characteristics of the visual element navigation pathways are based on a weighting of the plurality of categories and additional categories according to the prior browsing history, and wherein the plurality of category images presented to the user are a subset of additional category images corresponding to additional categories included in the super-category and are selected from the super-category for presentation to the user by the weighting,
wherein each category image of the plurality of category images is presented to the user without text describing each category image; and
presenting to the user a reduced size map of the visual browsing portal content simultaneously with the visual browsing portal, the reduced size map comprising a high-level overview of a visible element navigation pathway of the super-category and the plurality of categories.

* * * * *